(12) United States Patent
Spears, II

(10) Patent No.: US 7,004,194 B2
(45) Date of Patent: Feb. 28, 2006

(54) CHECK VALVE WITH PRESSURE RELIEF FEATURE

(75) Inventor: Robert W. Spears, II, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 48 days.

(21) Appl. No.: 10/825,446

(22) Filed: Apr. 14, 2004

(65) Prior Publication Data

US 2005/0229978 A1    Oct. 20, 2005

(51) Int. Cl.
*F16K 15/03*    (2006.01)

(52) U.S. Cl. ............... 137/527.8; 137/312; 137/513.3; 137/527; 137/493

(58) Field of Classification Search ............... 137/312, 137/513.3, 513.5, 493, 493.8, 493.9, 527, 137/527.2, 527.4, 527.6, 527.8
See application file for complete search history.

(56) References Cited

U.S. PATENT DOCUMENTS

| | | | | | |
|---|---|---|---|---|---|
| 2,578,590 | A | * | 12/1951 | Perrault | 137/493.5 |
| 2,767,735 | A | * | 10/1956 | Darling | 137/527 |
| 3,212,520 | A | * | 10/1965 | Carlton | 137/493.1 |
| 4,090,529 | A | * | 5/1978 | Schuller et al. | 137/516.29 |
| 4,249,568 | A | * | 2/1981 | Duggan | 137/513 |
| 6,543,474 | B1 | * | 4/2003 | Fetterman, Jr. | 137/493.1 |

\* cited by examiner

*Primary Examiner*—Ramesh Krishnamurthy
(74) *Attorney, Agent, or Firm*—Denton L. Anderson; Sheldon & Mak

(57) ABSTRACT

A check valve has a valve body and flapper. The flapper has a gasket which is sandwiched between a flapper base and a flapper cover. The flapper base has a flapper base stem which extends through an aperture in the gasket is retained within an aperture in the flapper cover. A central recess is defined in either the forward surface of the flapper base or the forward surface of the flapper cover to allow liquid which leaks between the flapper base and the gasket to migrate to the flapper base stem, and subsequently along the flapper base stem to the external side of the flapper cover. In this way, the flapper is capable of relieving pressure build-up between the gasket and the surface of the flapper base.

18 Claims, 3 Drawing Sheets

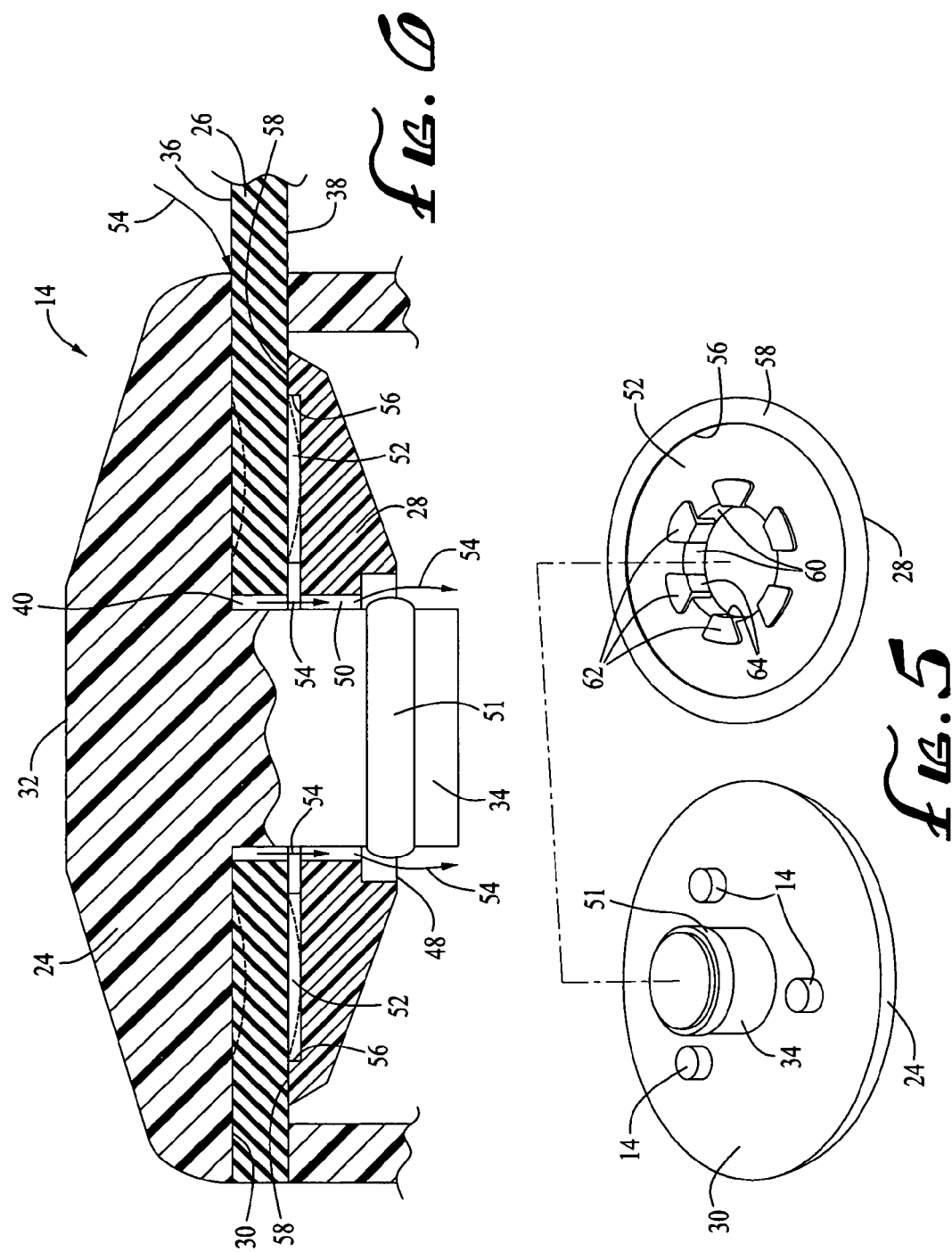

CHECK VALVE WITH PRESSURE RELIEF FEATURE

FIELD OF THE INVENTION

This invention relates generally to check valves and, more specifically, to lightweight check valves.

BACKGROUND OF THE INVENTION

Check valves are very common piping fittings which are used to prevent back flow within a run of pipe. A check valve has a body with a hinged flapper disposed inside. The body and the flapper are adapted so that, when back flow occurs within the body, the flapper seals against a valve seat within the body, thereby closing the valve.

A lightweight type of check valve frequently used in plastic pipe runs is a check valve having a gasket sandwiched between a flapper base and a flapper cover. The flapper base has a flapper base stem which extends through a central aperture in the gasket and through a central aperture in the gasket cover. The composite, consisting of flapper base, gasket and flapper cover, is typically held together by the cooperation of the flapper base stem with the flapper cover. Typically, such cooperation takes the form of press-fit or snap-on fit, although adhesives and welding are also sometimes used to connect the flapper base stem and the flapper cover.

A problem exists with such check valves when pressurized liquid on the downstream side of the flapper seeps between the flapper base and the gasket when the flapper is in the closed position. Such seepage leads to pressure build-up across the face of the gasket surface which exerts a significant force against the flapper cover. Such force is frequently sufficient to break the connection between the flapper base stem and the flapper cover, causing the flapper to come apart.

Accordingly, there is a need for a check valve which avoids the aforementioned problem in the prior art in an inexpensive and efficient manner.

SUMMARY

The invention satisfies this need. The invention is a check valve comprising a valve body and a flapper. The valve body defines an internal valve seat. The flapper is hingedly retained within the valve body and is sized and dimensioned to mate with the valve seat. The flapper is adapted to alternatively swing between (i) a closed position wherein the flapper is in sealing contact with the valve seat, and (ii) an open position wherein the flapper is spaced apart from the valve seat. The flapper comprises (a) a flapper base having a forward surface, a rearward surface and a flapper base stem extending away from the forward surface; (b) a gasket having a first surface, a second surface and a central aperture, the first surface of the gasket being disposed in abutment with the flapper base, with the flapper base stem disposed through the central aperture in the gasket; and (c) a flapper cover having a forward surface, a rearward surface and a central aperture, the forward surface of the flapper cover being disposed in abutment with the second surface of the gasket with the flapper base stem disposed through the central aperture in the flapper cover. In the invention, a central recess is defined in either the forward surface of the flapper base or in the forward surface of the flapper cover, the central recess being sufficient in depth and area to allow liquid disposed between the flapper base and the gasket when the flapper is in the first flapper position to migrate to the flapper base stem.

DRAWINGS

These and other features, aspects and advantages of the present invention will become better understood with reference to the following description, appended claims and accompanying drawings where:

FIG. 5 is another side view of the flapper illustrated in FIG. 3 showing how liquid can seep between the gasket and the flapper face; and FIG. 6 is an enlarged cross-sectional view of the flapper assembly illustrated in FIG. 5 showing how features of the invention tend to prevent overpressuring of the flapper assembly.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figure 1:
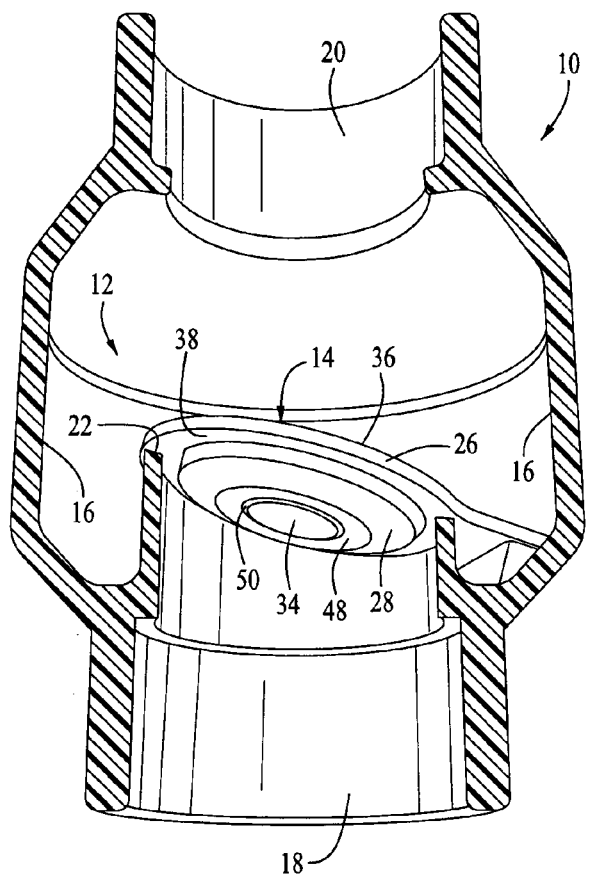
FIG. 1 is a cutaway perspective view of a check valve having features of the invention.
Figure 2:
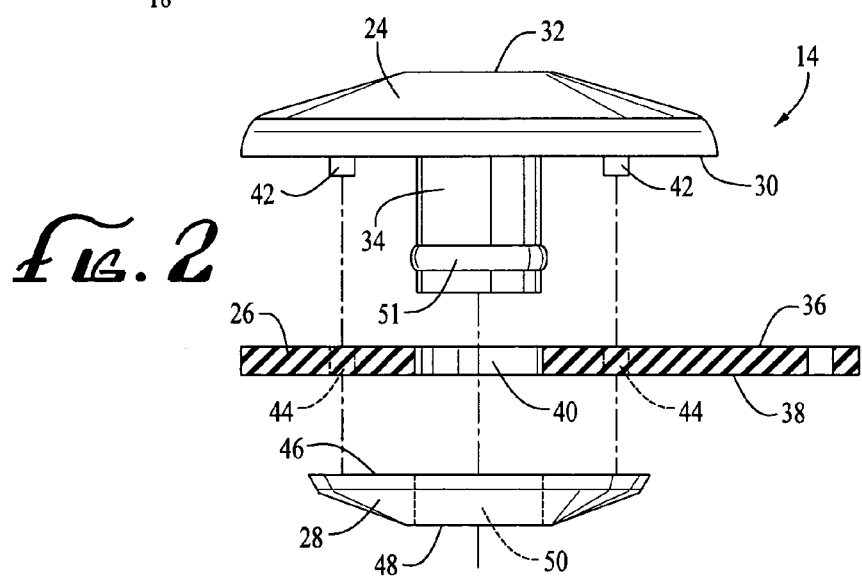
FIG. 2 is an exploded side view of a flapper mechanism useable in the check valve illustrated in FIG. 1.
Figure 3:
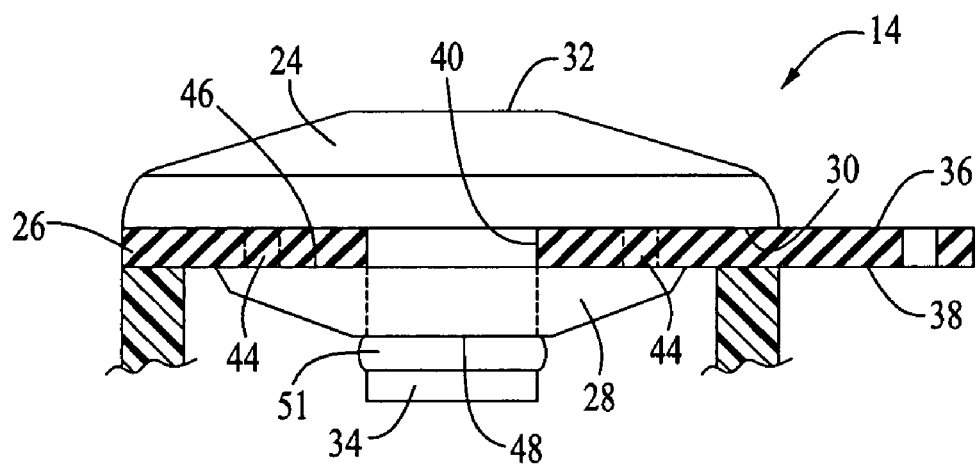
FIG. 3 is a cross-sectional side view of the flapper illustrated in FIG. 2, the flapper being shown fully assembled.
Figure 4:
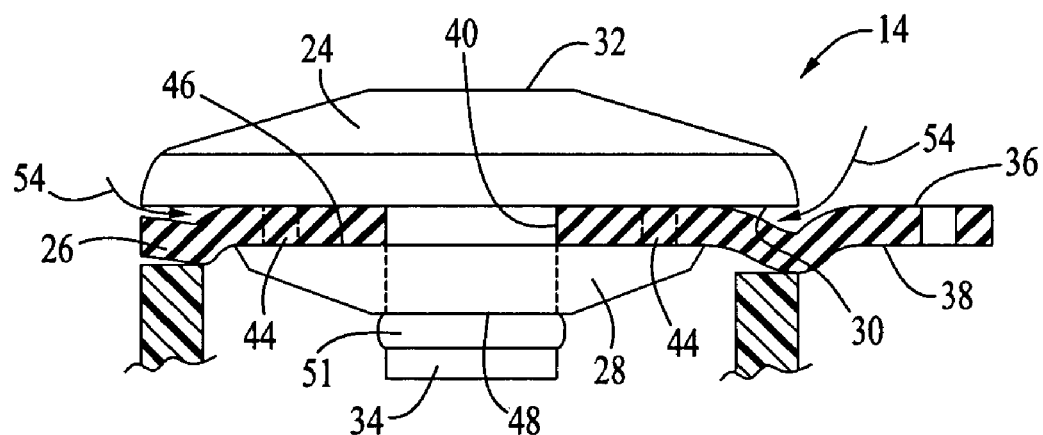
FIG. 4 is a perspective exploded view of the flapper base and flapper cover illustrated in FIG. 3.

The invention is a unique check valve 10 comprising a valve body 12 and a flapper 14. The check valve 10 of the invention is illustrated in FIG. 1.

The valve body 12 has side walls 16, an inlet opening 18 and an outlet opening 20. Defined within the valve body 12 is a valve seat 22.

The flapper 14 is hingedly retained within the valve body 12. The flapper 14 is sized and dimensioned to mate with the valve seat 22, so as to seal closed the valve seat 22. The flapper 14 is adapted to alternatively swing between (i) a closed position wherein the flapper 14 is in sealing contact with the valve seat 22, and (ii) an open position wherein the flapper 14 is spaced apart from the valve seat 22.

The flapper 14 comprises a flapper base 24, a gasket 26 and a flapper cover 28.

The flapper base 24 has a forward surface 30, a rearward surface 32 and a flapper base stem 34 extending away from the forward surface 30. When the flapper 14 is in the closed position, the rearward surface 32 of the flapper 14 faces the outlet opening 20. Typically, the flapper base 24 is made from a plastic material, such as PVC, for ease of manufacture and for resistance to corrosive materials.

The gasket 26 has a first surface 36, a second surface 38 and a central aperture 40. The first surface 36 of the gasket 26 is disposed in abutment with the forward surface 30 of the flapper base 24. The gasket 26 is disposed in conjunction with the flapper base 24 such that the flapper base stem 34 protrudes through the central aperture 40 in the gasket 26. Typically, the gasket 26 is made from a resilient material such as EPDM or other rubber, and has a uniform thickness of between about 0.03 inch and about 0.375 inch.

Also typically, the flapper 14 is retained within the valve body 12 by an extension of the gasket 26 which is attached to the valve body 12 proximate to the side wall 16 of the valve body 12. In such embodiments, the gasket 26 provides the hinge mechanism which allows the flapper 14 to alternatively swing between the open position and the closed position.

In the embodiment illustrated in the drawings, the forward surface 32 of the flapper base 24 also defines a plurality of spaced apart locating pegs 42 adapted to align with matching peripheral apertures 44 in the gasket 26 to correctly seat the gasket 26 in abutment with the forward surface 30 of the flapper base 24.

The flapper cover 28 has a forward surface 46, a rearward surface 48 and a central aperture 50. The forward surface 46 of the flapper cover 28 is disposed in abutment with the second surface 38 of the gasket 26. The central aperture 50 of the flapper cover 28 is sized and dimensioned to receive the flapper base stem 34 therethrough. Typically, the flapper cover 28 is made from a plastic material, such as PVC, for ease of manufacture and for resistance to corrosive materials.

The flapper base stem 34 is attached to the central aperture 50 in the flapper cover 28, typically by press-fit or snap-fit. In some embodiments, the flapper base stem 34 is attached to the flapper cover central aperture 50 with localized areas of a suitable adhesive or by welding, sonic heat spin techniques, etc. In the embodiment illustrated in the drawings, the snap-fit is provided by adapting the flapper base stem 34 with a rounded circumferential band 51 having a slightly increased diameter over the nominal diameter of the remainder of the stem 34. The rounded band 51 is sized and dimensioned to snap through the central aperture 50 in the flapper cover 28 upon the exertion of pressure directed against the rearward surface 32 of the flapper base 24 while holding securely the rearward surface 48 of the flapper cover 28.

A central recess 52 is defined in either the forward surface 30 of the flapper base 24 or in the forward surface 46 of the flapper cover 28. The central recess 52 is sufficient in depth and area to allow liquid 54 which becomes disposed between the flapper base 24 and the gasket 26 when the flapper 14 is in the closed position to migrate to the flapper base stem 34. Once such liquid 54 has migrated to the flapper base stem 34, the liquid 54 can migrate up the flapper base stem 34, through the gasket 26, through the central aperture 50 in the flapper cover 28 to the rearward surface 48 of the flapper cover 28. By providing such a central recess 52, the invention endows the check valve of the invention 10 with important pressure relief characteristics.

In the embodiment illustrated in the drawings, the central recess 52 has an outer border 56 provided by a radial ridge 58 which is defined in the forward surface 46 of the flapper cover 28. The radial ridge 58 typically has a generally uniform height above the forward surface 46 of the flapper cover 28 of between about 0.005 inch and about 0.1 inch. Also, the radial ridge 58 typically has a generally uniform width of between about 0.05 and about 0.5 inch.

In the embodiment illustrated in the drawings, the central recess 52 is further provided by grooves 60 in the forward surface 46 of the flapper cover 28. Such grooves 60 are disposed between a plurality of spaced apart nodes 62 which are located proximate to the central aperture 50 in the forward surface 46 of the flapper cover 28. In the embodiment illustrated in the drawings, the forward surface 46 of the flapper cover 28 defines 6 nodes 62. Typically, the forward surface 46 of the flapper cover 28 defines between about 3 and about 20 nodes 62, most typically between about 5 and about 7 nodes 62. The nodes 62 are generally disposed above the forward surface 46 of the flapper cover 28 by a distance of between about 0.005 inch and about 0.1 inch. The nodes 62 have bases 64, each of which is spaced apart from an adjoining base 64 by a distance of between about 0.03 inch and about 0.3 inch.

As illustrated in FIGS. 5 and 6, the providing of the central recess 52 in either the forward surface 30 of the flapper base 24 or in the forward surface 46 of the flapper cover 28 allows the unique check valve of the invention 10 to bleed off potentially damaging pressures which can build up between the flapper base 24 and the gasket 26. This is accomplished by providing the central recess 52 which allows room for the gasket 26 to be pushed sufficiently aside to provide passage ways for liquid 54 between the forward surface 30 of the flapper base 24 and the gasket 26 to migrate to the flapper base stem 34 and then, subsequently, to migrate up the flapper base stem 34 to the low pressure side at the rearward surface 48 of the flapper cover 28. Thus, it can be seen that the central recess feature 52 in the check valve of the invention 10 provides that check valve 10 with important pressure relief characteristics which avoids the periodic failures associated with prior art designs.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A check valve comprising a valve body and a flapper, the valve body defining an internal valve seat, the flapper being hingedly retained within the valve body, being sized and dimensioned to mate with the valve seat, and being adapted to alternatively swing between (i) a closed position wherein the flapper is in sealing contact with the valve seat, and (ii) an open position wherein the flapper is spaced apart from the valve seat, the flapper comprising:
   (a) a flapper base having a forward surface, a rearward surface and a flapper base stem extending away from the forward surface;
   (b) a gasket having a first surface, a second surface and a central aperture, the first surface of the gasket being disposed in abutment with the flapper base, with the flapper base stem disposed through the central aperture in the gasket; and
   (c) a flapper cover having a forward surface, a rearward surface and a central aperture, the forward surface of the flapper cover being disposed in abutment with the second surface of the gasket with the flapper base stem disposed through the central aperture in the flapper cover;
   wherein a central recess is defined in either the forward surface of the flapper base or in the forward surface of the flapper cover, the central recess being sufficient in depth and area to allow liquid disposed between the flapper base and the gasket when the flapper is in the closed flapper position to migrate to the flapper base stem.

2. The check valve of claim 1 wherein the central recess has an outer border provided by a radial ridge defined on the forward surface of the flapper cover.

3. The check valve of claim 2 wherein the radial ridge has a generally uniform height above the forward surface of the flapper cover of between about 0.005 inch and about 0.1 inch.

4. The check valve of claim 2 wherein the radial ridge has a generally uniform width of between about 0.05 inch and about 0.5 inch.

5. The check valve of claim 1 wherein the central recess is provided by grooves in the forward surface of the flapper cover.

6. The check valve of claim 5 wherein the forward surface of the flapper cover has a plurality of spaced apart nodes disposed proximate to the central aperture in the flapper cover, and wherein the grooves in the forward surface of the flapper cover are defined by gaps between the nodes.

7. The check valve of claim 6 wherein the nodes are between about 3 and about 20 in number.

8. The check valve of claim 6 wherein the nodes are between about 5 and about 7 in number.

9. The check valve of claim 6 wherein the nodes are disposed above the forward surface of the flapper cover by a distance of between about 0.005 inch and about 0.1 inch.

10. The check valve of claim 6 wherein the nodes each have bases and wherein each base is separated from an adjoining base by a distance of between about 0.03 inch and about 0.3 inch.

11. The check valve of claim 1 wherein the flapper cover is attached to the flapper base by a snap fit.

12. A check valve comprising a valve body and a flapper, the valve body defining an internal valve seat, the flapper being hingedly retained within the valve body, being sized and dimensioned to mate with the valve seat, and being adapted to alternatively swing between (i) a closed position wherein the flapper is in sealing contact with the valve seat, and (ii) an open position wherein the flapper is spaced apart from the valve seat, the flapper comprising:
   (a) a flapper base having a forward surface, a rearward surface and a flapper base stem extending away from the forward surface;
   (b) a gasket having a first surface, a second surface and a central aperture, the first surface of the gasket being disposed in abutment with the flapper base, with the flapper base stem disposed through the central aperture in the gasket; and
   (c) a flapper cover having a forward surface, a rearward surface and a central aperture, the forward surface of the flapper cover being disposed in abutment with the second surface of the gasket with the flapper base stem disposed through the central aperture in the flapper cover;
   wherein a central recess is defined in the forward surface of the flapper cover, the central recess being sufficient in depth and area to allow liquid disposed between the flapper base and the gasket when the flapper is in the closed flapper position to migrate to the flapper base stem, the central recess being provided by a radial ridge defined on the forward surface of the flapper cover and between about 3 and about 20 spaced apart nodes defined on the forward surface of the flapper cover, proximate to the central aperture of the flapper cover.

13. The check valve of claim 12 wherein the radial ridge has a generally uniform height above the forward surface of the flapper cover of between about 0.005 inch and about 0.1 inch.

14. The check valve of claim 12 wherein the radial ridge has a generally uniform width of between about 0.05 inch and about 0.5 inch.

15. The check valve of claim 12 wherein the nodes are between about 5 and about 7 in number.

16. The check valve of claim 12 wherein the nodes are disposed above the forward surface of the flapper cover by a distance of between about 0.005 inch and about 0.1 inch.

17. The check valve of claim 12 wherein the nodes each have bases and wherein each base is separated from an adjoining base by a distance of between about 0.03 inch and about 0.3 inch.

18. The check valve of claim 12 wherein the flapper cover is attached to the flapper base by a snap fit.

* * * * *